United States Patent
Kautz

[15] 3,680,023
[45] July 25, 1972

[54] THERMOSTAT USING THE HEAT ANTICIPATION HEATER AS A PART OF THE MECHANICAL CONNECTION BETWEEN THE TEMPERATURE RESPONSIVE ELEMENT AND SWITCH OPERATING MEMBER

[72] Inventor: Murrell F. Kautz, Minneapolis, Minn.
[73] Assignee: Honeywell Inc., Minneapolis, Minn.
[22] Filed: June 1, 1971
[21] Appl. No.: 148,362

[52] U.S. Cl............................................337/377, 337/107
[51] Int. Cl.................................H01h 37/14, H01h 37/52
[58] Field of Search....................337/77, 100, 102, 107, 377

[56] References Cited

UNITED STATES PATENTS 3,463,008   8/1969   Teichert et al..................337/100 UX
3,277,260  10/1966   Anderson.........................337/377 X
2,748,223   5/1956   Frank..................................337/100
2,520,906   9/1950   Cade....................................337/107

FOREIGN PATENTS OR APPLICATIONS 1,016,320   1/1966   Great Britain......................337/377

Primary Examiner—Bernard A. Gilheany
Assistant Examiner—Dewitt M. Morgan
Attorney—Lamont B. Koontz and Clyde C. Blinn

[57] ABSTRACT

A thermostat having a temperature responsive means for providing a mechanical output force to operate a switch wherein a heater means, for providing heat to a thermostat for heat anticipation, provides the mechanical connection between the temperature responsive means and the switch whereby the thermal connection between the heater means and the temperature responsive means remains the same throughout the operation of the thermostat.

8 Claims, 4 Drawing Figures

PATENTED JUL 25 1972 3,680,023

INVENTOR.
MURRELL F. KAUTZ
BY Clyde C. Blinn
ATTORNEY.

THERMOSTAT USING THE HEAT ANTICIPATION HEATER AS A PART OF THE MECHANICAL CONNECTION BETWEEN THE TEMPERATURE RESPONSIVE ELEMENT AND SWITCH OPERATING MEMBER

BACKGROUND AND SUMMARY OF THE INVENTION

In thermostats wherein a temperature responsive element such as a bimetal operates a switch for controlling heating and/or cooling apparatus, the use of an electrical heater to artificially heat the temperature responsive means for heat anticipation purposes is broadly old. Many schemes have been devised for making the thermal connection or heat conducting path between the heater and the temperature responsive means as low as possible. For example in the V. R. Anderson U.S. Pat. No. 3,277,260, the heater is mounted adjacent the bimetal in a cavity in the base which projects close to the bimetal. In the R. A. Alcott U.S. Pat. No. 2,993,969 a portion of the sensing element is extended to be near the heat source. In the H. W. Scott U.S. Pat. No. 3,098,138, the bimetal is used as the heater. In the W. E. Edelman et al. U.S. Pat. No. 3,284,002, the heater is mounted in a resilient holder engaging the end of the support shaft for the main bimetal. In the C. L. Nelson U.S. Pat. No. 3,316,374, the heater is mounted on a card attached to the support shaft for the bimetal.

In a thermostat where the bimetal moves so that the air space between the heater and bimetal changes with different positions of the bimetal, the heat transfer path changes which effects the operation of the thermostat. When the heater is mounted directly on the bimetal, a load is imposed on the bimetal which can have some affect upon its mechanical output.

In the present invention the electrical heater providing heat to the temperature responsive means for heat anticipation is used as a part of or the mechanical connection between the temperature responsive means and the switch operating member. The electrical heater is always in close thermal contact with the temperature responsive means or bimetal regardless of the position of the bimetal to provide a thermal connection between the heater and the bimetal which remains unchanged throughout the operation of the thermostat.

DESCRIPTION OF THE INVENTION

Figure 1:
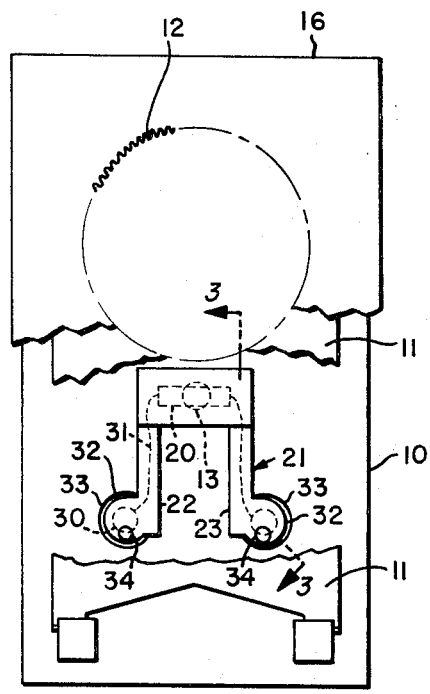
FIG. 1 is a front view of the thermostat showing the bimetal and base with the support for the heat anticipation heater.

Referring to FIG. 1 a thermostat has a base member 10 and a cover 16. A temperature responsive element or bimetal 11 is pivotally supported on base 10 at one end thereof and adjusted at the other end by a knob 12 having a cam surface. Bimetal 11 engages a switching operating pin or mechanical input 13 for operating a switch 14 for controlling an electrical load such as heating and/or cooling apparatus. The details of the thermostat are more explicitly shown in the Vincent R. Anderson U.S. Pat. No. 3,277,260 as the present application is concerned with an improvement to the thermostat of the Anderson patent.

Figure 2:
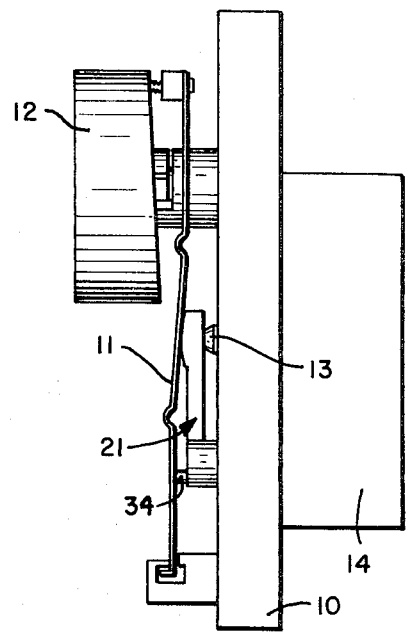
FIG. 2 is a side view of the thermostat showing the U-shaped lever supporting the heater between the bimetal and switch operating pin.
Figure 3:
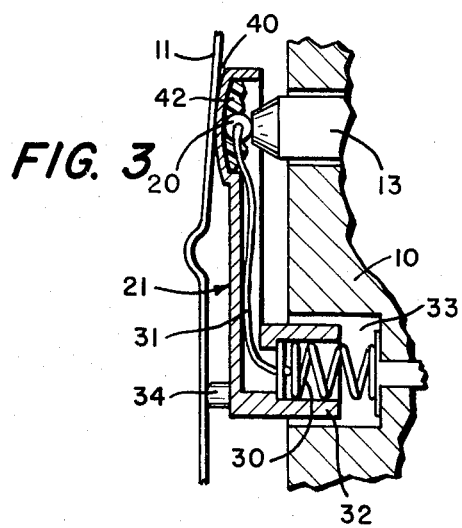
FIG. 3 is an enlarged view of the heater configuration.

A heat anticipation heater or electrical resistor heater element 20 is supported in a U-shaped carrier or lever member 21 which is captivated or pivoted at its ends 22 and 23 on base 10. Heater 20 is held between the mechanical output surface or underside of bimetal 11 and pin 13 as shown in FIGS. 2 and 3 whereby upon movement of the bimetal to left or right as the thermostat changes temperature, pin 13 is moved to operate the switch. Carrier 21 is resiliently connected to base 10 by springs 30 which also provide the electrical connection for the heater 20 through the conductors 31 extending through the legs of carrier 21.

Specifically, as shown in FIG. 3, carrier 21 has a pair of projections 32 which extend into holes 33 in base 10 whereby carrier 21 is held against the force of springs 30 by a pair of projections 34 extending in the opposite direction to engage bimetal 11. When heater 20 is connected into the thermostat circuit whether it be as a series connected heater of a parallel connected "voltage type" heater, the thermal conducting path for the heat from heater 20 to the bimetal remains unchanged throughout the operation of the thermostat. As bimetal bends to push the operating pin 13 of the switch to the left or right as shown in FIGS. 2 and 3, the contact or engagement with heater 20 remains substantially the same. As carrier 21 is held against bimetal 11 at projections 34 and at heater 20 by the thrust of the two springs 30 and the thrust of the switch operating pin 13, the carrier follows the movement of the bimetal 11 at all temperatures to maintain heater 20 in a most efficient contact with bimetal.

To increase the conductivity of the heat from heater 20 to bimetal 11, as well as, to cut down the mechanical friction, heat conductive grease 40 is placed between heater 20 on lever 21 and bimetal 11. The carrier 21 provides for shielding of conductors 31 and resistor 20 to prevent hazardous contact in the semi-open thermostat compartment of bimetal 11. The resistor 20, and even the conductors 31 if desired, can be potted with a suitable compound 42 to achieve additional insulation and/or to hold the resistor and conductors in place in the carrier 21.

Figure 4:
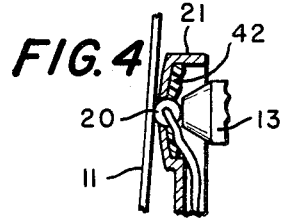
FIG. 4 is an enlarged view of another embodiment of the heater configuration.

Another embodiment of carrier 21 is shown in FIG. 4. Resistor 20 is mounted in a hole in carrier 21 to engage bimetal 11 for a more efficient thermal contact. Resistor 20 directly contacts bimetal 11 and pin 13 by having the thrust of pin 13 applied to bimetal 11 through resistor 20. Resistor 20 is suitably potted to be held in place in carrier 21 by compound 42.

The embodiments of the invention in which an exclusive property or right is claimed are defined as follows:

1. A thermostat comprising
   a base member,
   temperature responsive means connected to said base member and having a surface providing a mechanical output force,
   a heater means for providing artificial heat to said temperature responsive means,
   switch means having a mechanical input means, and
   mechanical connection means including said heater means for operably connecting said surface providing said mechanical output force to said mechanical input means of said switch means whereby heat from said heater means is conducted through said connection means to said temperature responsive means.

2. The invention of claim 1 wherein,
   said temperature responsive means is a bimetal element pivotally supported at one end thereof to said base member and the position of the other end thereof adjusted by a cam whereby said mechanical output is provided at a center portion of said bimetal,
   said heater means is an electrical resistor supported by a lever arm pivotally connected to said base,
   said mechanical input means of said switch means has a switch operating pin for operating a switch when said pin is moved inward, and
   said resistor is held by said lever arm between said center portion of said bimetal and said pin to allow said resistor to have full freedom to move with said bimetal whereby a heat conducting path between said heater means and said temperature responsive means remains unchanged.

3. The invention of claim 2 wherein said lever is a U-shaped member and the free ends of said member are pivotally connected to said base member by resilient members.

4. The invention of claim 3 wherein said resilient members provide electrical connections for said heater means.

5. The invention of claim 3 wherein said U-shaped member is biased by said resilient members at said free ends against said bimetal.

6. The invention of claim 1 wherein
said heater means is supported on said base member to follow the movement of said output surface of said temperature responsive means whereby a heat conducting path between said heater and said temperature responsive means remains the same throughout the operation of the thermostat.

7. A thermostat comprising
a base member,
temperature responsive means connected to said base member and having a surface providing a mechanical output force,
a heater means providing artificial heat to said temperature responsive means,
switch means having a mechanical input means, and
means supporting said heater means as an operable connection between said surface providing said mechanical output force and said mechanical input means of said switch means.

8. The invention of claim 7 wherein,
said temperature responsive means is a bimetal element pivotally supported on said base member,
said heater means is an electrical resistor supported by a carrier captivated to said base,
said resistor is held to engage said bimetal and said mechanical input whereby the heat conducting path between said heater means and said temperature responsive means remains unchanged throughout the operation of said thermostat.

* * * * *